United States Patent
Ogawa (10) Patent No.: US 7,538,817 B2
(45) Date of Patent: May 26, 2009

(54) DIGITAL CAMERA FOR PORTABLE EQUIPMENT

(75) Inventor: Kimiaki Ogawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 504 days.

(21) Appl. No.: 11/065,367

(22) Filed: Feb. 25, 2005

(65) Prior Publication Data

US 2005/0190287 A1    Sep. 1, 2005

(30) Foreign Application Priority Data

Feb. 26, 2004    (JP) .............................. 2004-051471

(51) Int. Cl.
   *H04N 5/222*    (2006.01)
(52) U.S. Cl. ...................... 348/370; 348/363
(58) Field of Classification Search ................. 348/370, 348/261.1, 311, 363, 296, 216, 362; 396/452
   See application file for complete search history.

(56) References Cited

U.S. PATENT DOCUMENTS

| | | | |
|---|---|---|---|
| 6,151,073 A * | 11/2000 | Steinberg et al. ............. | 348/371 |
| 6,426,775 B1 * | 7/2002 | Kurokawa .................... | 348/363 |
| 6,784,938 B1 * | 8/2004 | Kidono et al. ............... | 348/364 |
| 7,163,344 B2 * | 1/2007 | Satoh ......................... | 396/497 |

| | | | |
|---|---|---|---|
| 2002/0191102 A1 | 12/2002 | Yuyama et al. | |
| 2003/0107656 A1 * | 6/2003 | Ito et al. ................... | 348/216.1 |
| 2003/0164881 A1 | 9/2003 | Ohe et al. | |

FOREIGN PATENT DOCUMENTS

| | | |
|---|---|---|
| JP | 7-104174 | 4/1995 |
| JP | 2002-357859 | 12/2002 |
| JP | 2003-179808 | 6/2003 |
| JP | 2003-241266 | 8/2003 |
| JP | 2003-259182 | 9/2003 |

OTHER PUBLICATIONS

English Language Abstract of JP 7-104174.
English Language Abstract of JP 2003-241266.

* cited by examiner

*Primary Examiner*—David L Ometz
*Assistant Examiner*—Ahmed A Berhan
(74) *Attorney, Agent, or Firm*—Greenblum & Bernstein, P.L.C.

(57) ABSTRACT

A digital camera for portable equipment includes a light emitting device; an electrically-driven light quantity controller for controlling a quantity of light emitted from the light emitting device; and a system controller which drives the light quantity controller and the light emitting device and controls operations of the light quantity controller and the light emitting device. In a state where the light emitting device is ON, the system controller turns the light emitting device OFF when the system controller drives the light quantity controller to capture an object image.

8 Claims, 9 Drawing Sheets

DIGITAL CAMERA FOR PORTABLE EQUIPMENT

BACKGROUND OF THE INVENTION

1. Field of the Invention

The present invention relates to a digital camera which is suitable for being incorporated in a portable device such as a cellular phone or a personal digital assistant.

2. Description of the Related Art

Various kinds of portable devices in which a digital camera is incorporated such as cellular phones and personal digital assistants (PDAs) have been developed. Such a digital camera has become increasingly sophisticated, and a digital-camera equipped personal digital assistant provided with high-intensity LEDs as a light emitting device has been proposed in Japanese laid-open patent publication No. 2003-259182. It has been desired in recent years for a digital camera incorporated in a portable device be equipped with a diaphragm device for enlarging the scope of exposure control and a mechanical shutter adapted to meet the demand for high-quality images.

However, in the case where an object image is captured with one or more high-intensity LEDs remaining lit, the peak current increases since a current for driving the high-intensity LED and a current for driving the diaphragm device are simultaneously passed through the high-intensity LED and the diaphragm device, respectively. An increase in the peak current may cause the voltage which is supplied to other electronic parts to drop and may damage the battery. On the other hand, a high-output/large-capacity battery is generally bulky and thus undesirable to be adopted as a power source of a small and lightweight portable device.

SUMMARY OF THE INVENTION

The present invention has been devised in view of the problems mentioned above, and provides a digital camera for portable equipment which is provided with an electrically-driven light quantity controller and a light emitting device capable of remaining on, wherein the peak current at the time of capturing an object image is prevented from increasing upon operating the light quantity controller and the light emitting device.

Additionally, the present invention provides a digital camera for portable equipment which is provided with an electrically-driven diaphragm or shutter mechanism and a light emitting device capable of remaining on, wherein a correct exposure is obtained while preventing the peak current from increasing upon operating the light emitting device and the diaphragm or shutter mechanism.

According to an aspect of the present invention, a digital camera for portable equipment is provided, including a light emitting device; an electrically-driven light quantity controller for controlling a quantity of light emitted from the light emitting device; and a system controller which controls operations of the light quantity controller and the light emitting device. In a state where the light emitting device is ON, the system controller turns the light emitting device OFF when the system controller drives the light quantity controller to capture an object image.

It is desirable for the light emitting device to include at least one high-intensity LED.

It is desirable for the light quantity controller to include a mechanical diaphragm which is driven by the system controller.

In an embodiment, a digital camera for portable equipment is provided, including a light emitting device; an electrically-driven light quantity controller for controlling a quantity of light emitted from the light emitting device; and a system controller which drives the light quantity controller and the light emitting device and controls operations of the light quantity controller and the light emitting device. When an object image is captured in a state where the light emitting device is ON, the system controller drives the light quantity controller to prevent light from passing through the light quantity controller after turning the light emitting device OFF before completion of an exposure.

It is desirable for the light emitting device to include at least one high-intensity LED.

It is desirable for the light quantity controller to include an electrically-driven diaphragm which is driven by the system controller.

In an embodiment, a digital camera for portable equipment is provided, including an imaging device; a light emitting device; a light quantity controller for controlling a quantity of light emitted from the light emitting device; and a system controller which drives the imaging device, the light quantity controller and the light emitting device, controls operations of the imaging device, the light quantity controller and the light emitting device, and determines a optimum exposure time in accordance with an image signal of an object image captured by the imaging device. The system controller determines the optimum exposure time with the light emitting device remaining on when an object image is captured with the light emitting device remaining on. In a state where the light emitting device is ON, the system controller turns the light emitting device OFF when the system controller drives the light quantity controller to stop down a photographing lens of the digital camera, and turns the light emitting device ON after completion of the driving of the light quantity controller.

It is desirable for the system controller to drive the light quantity controller to stop down the photographing lens and subsequently determine the optimum exposure time after turning the light emitting device ON after completion of the driving of the light quantity controller. When an exposure is started at the optimum exposure time, the system controller turns the light emitting device OFF immediately after a lapse of the optimum exposure time, and thereafter the system controller drives the light quantity controller to prevent light from passing through the light quantity controller to complete the exposure.

It is desirable for the light emitting device to include at least one high-intensity LED.

It is desirable for the light quantity controller to include an electrically-driven diaphragm which is driven by the system controller.

In an embodiment, a digital camera for portable equipment is provided, including an imaging device; a light emitting device; an electrically-driven mechanical shutter for controlling a quantity of light emitted from the light emitting device; and a system controller which drives the imaging device, the mechanical shutter and the light emitting device, controls operations of the imaging device, the mechanical shutter and the light emitting device, and determines a optimum exposure time in accordance with an image signal of an object image captured by the imaging device. When an object image is captured with the light emitting device turned ON at a low intensity, the system controller determines the optimum exposure time with the light emitting device remaining ON at the low intensity, controls the light emitting device to remain ON at a high intensity at a commencement of an exposure, and drives the mechanical shutter to fully shut after turning the light emitting device OFF before completion of the exposure.

The system controller can determine a underexposure-prevention time, at which the system controller turns the light emitting device OFF and commences to drive the mechanical shutter, so that the mechanical shutter is approximately half shut upon a lapse of the optimum exposure time.

In an embodiment, a digital camera for portable equipment is provided, including an imaging device; a light emitting device; an electrically-driven mechanical shutter for controlling a quantity of light emitted from the light emitting device; and a system controller which drives the imaging device, the mechanical shutter and the light emitting device, controls operations of the imaging device, the mechanical shutter and the light emitting device, and determines a optimum exposure time in accordance with an image signal of an object image captured by the imaging device. When an object image is captured with the light emitting device turned ON, the system controller determines the optimum exposure time with the light emitting device remaining ON, subsequently determines a underexposure-prevention time, at which the system controller turns the light emitting device OFF while the system controller commences to drive the mechanical shutter after the imaging device commences an exposure operation, so that the mechanical shutter is approximately half shut at a lapse of the optimum exposure time, and subsequently commences to drive the mechanical shutter after turning the light emitting device OFF upon a lapse of the underexposure-prevention time from the commencement of the exposure operation.

It is desirable for the light emitting device to include at least one high-intensity LED.

According to an aspect of the present invention, although the digital camera includes a light emitting device and an electrically-driven mechanical shutter, the peak current for driving these devices can be minimized.

According to another aspect of the present invention, an exposure value which is substantially the same as a correct exposure value determined before the commencement of an exposure can be obtained.

The present disclosure relates to subject matter contained in Japanese Patent Application No. 2004-051471 (filed on Feb. 26, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
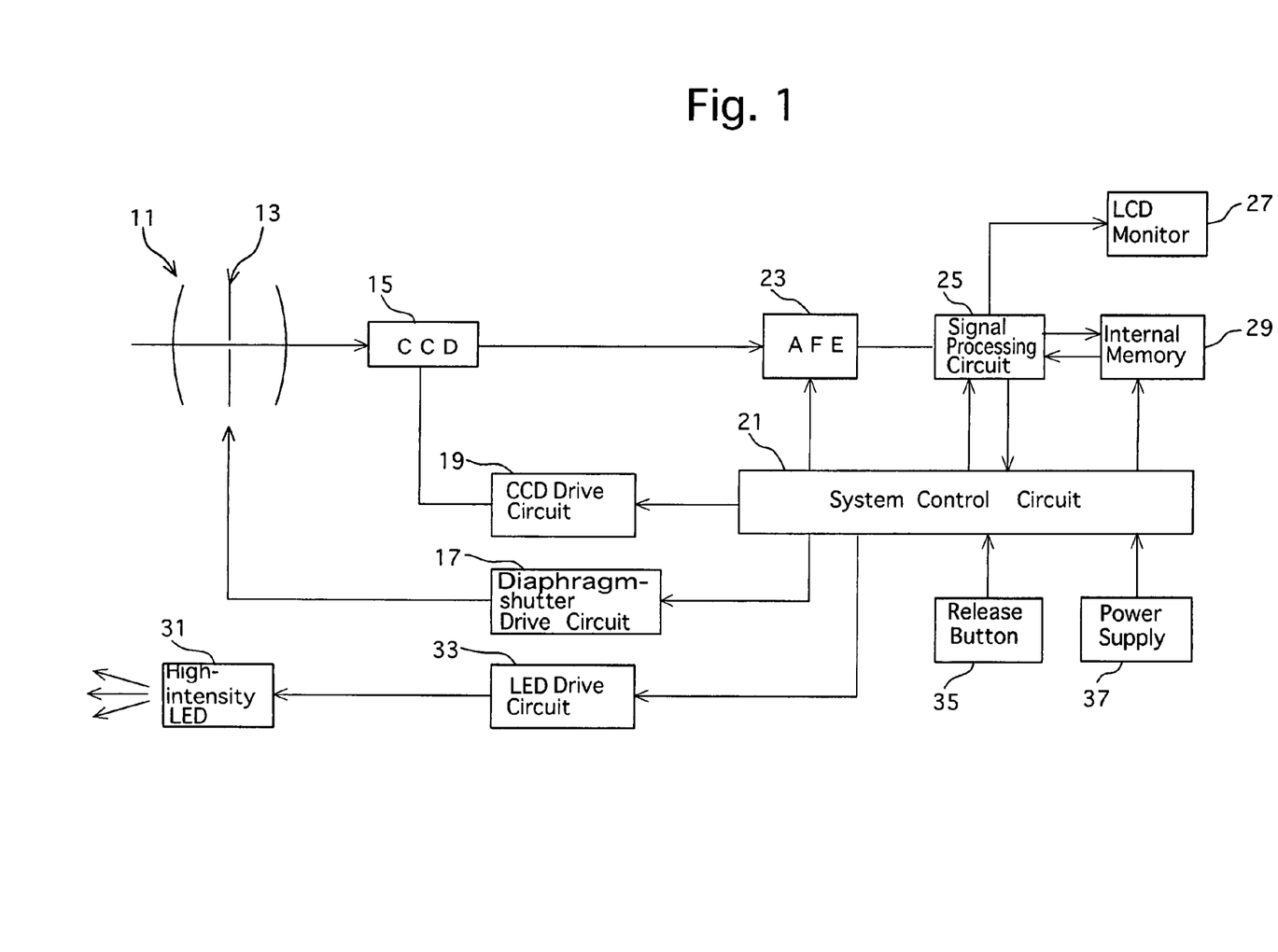
FIG. 1 is a schematic block diagram of components of an embodiment of a digital camera for portable equipment according to the present invention.

FIG. 1 shows elements of an embodiment of a digital camera for portable equipment according to the present invention. This digital camera is incorporated in a portable such as a PDA or a cellular phone. The circuitry which operates exclusively for primary functions of the portable device (i.e., not for functions of the digital camera) are not shown in FIG. 1 for the purpose of simplifying the drawing.

The digital camera is provided with a photographing lens 11 including a mechanical diaphragm shutter (electrically-driven light quantity controller) 13 which serves as a diaphragm and a shutter. The diaphragm shutter 13 serves as a light quantity controller. The digital camera is provided with a CCD image sensor (image pick-up device) 15, a diaphragm-shutter drive circuit 17 and a CCD drive circuit 19. An object-image-forming light bundle which is passed through the photographing lens 11 and the diaphragm shutter 13 is focused on the CCD image sensor 15 to be formed as an object image thereon. The diaphragm shutter 13 is driven by the diaphragm-shutter drive circuit 17, while the CCD image sensor 15 is driven by the CCD drive circuit 19. When not energized, the diaphragm shutter 13 is held at rest in a moving range thereof between a fully opened position and a fully closed position. Upon being energized, the diaphragm shutter 13 operates to make the shutter blades thereof move in a direction to open or shut the shutter blades.

The digital camera is provided with a system control circuit (system controller) 21 which controls operations of the diaphragm-shutter drive circuit 17 and the CCD drive circuit 19. The system control circuit 21 comprehensively controls the overall operations of the digital camera.

The digital camera is provided with an AFE (analog front end) 23. The CCD image sensor 15 converts the received object light into an electric charge pixel by pixel, accumulates (integrates) the electric charges, and converts the accumulated electric charges into an analogue image signal to output this signal to the AFE 23.

The CCD image sensor 15 is driven by the CCD drive circuit 19 in accordance with signals (e.g., a vertical driving signal, a horizontal driving signal and a sweep signal) output from the CCD drive circuit 19. Each of the vertical driving signal and the horizontal driving signal sequentially shifts each pixel signal of the CCD image sensor 15, while the sweep signal sweeps the electric charge accumulated at each pixel therefrom to a substrate. Electric charges are not accumulated (integrated) during the time the sweep signal is output from the CCD drive circuit 19, and commence accumulation immediately after the CCD drive circuit 19 stops outputting the sweep signal. A time interval between the moment at which the CCD drive circuit 19 stops outputting the sweep signal and the moment at which the CCD drive circuit 19 outputs a subsequent vertical synchronization signal corresponds to an exposure time (integral action time or accumulation time for capturing one image). The sweep signal is output in synchronization with the vertical synchronization signal which is output at predetermined intervals from the system control circuit 21. After the diaphragm shutter 13 is shut immediately before the vertical synchronization signal is output, the electric charges accumulated by the light receiving elements of the CCD image sensor 15 are output to the AFE 23 as an electric analogue signal over two fields.

The analogue image signal is converted into a digital signal at the AFE 23, and subsequently this digital signal is converted into an image signal having a predetermined format via a signal processing circuit 25 to be displayed as a visual image on an LCD monitor 27 and stored in an internal memory 29.

The digital camera is provided with a high-intensity LED (light emitting device) 31 which serves as a light emitting device at a time of exposure. The high-intensity LED 31 is not a type of light-emitting device which flashes like a flash lamp but a type of light-emitting device which lights up and is capable of remaining on. The system control circuit 21 controls the light-emitting operation of the high-intensity LED 31 via the LED drive circuit 33 so that the high-intensity LED 31 lights up when an image is captured under certain conditions, e.g., in low light. The portable device in which the present embodiment of the digital camera is incorporated is provided with a release button 35 which is operated to start an imaging process. Upon the release button 35 being operated, operations for the imaging process are performed by the system control circuit 21.

The system control circuit 21 selects a camera mode from among various camera modes such as digital camera mode, high-intensity LED lighting mode and moving-image mode (video mode) in response to operations of a group of manual operation switches (not shown; e.g., a mode selection switch) provided on the portable device. In digital camera mode, the CCD image sensor 15 is generally driven in a manner similar to that of a camcorder, so that visual images captured at predetermined intervals are displayed on the LCD monitor 27.

Figure 2:
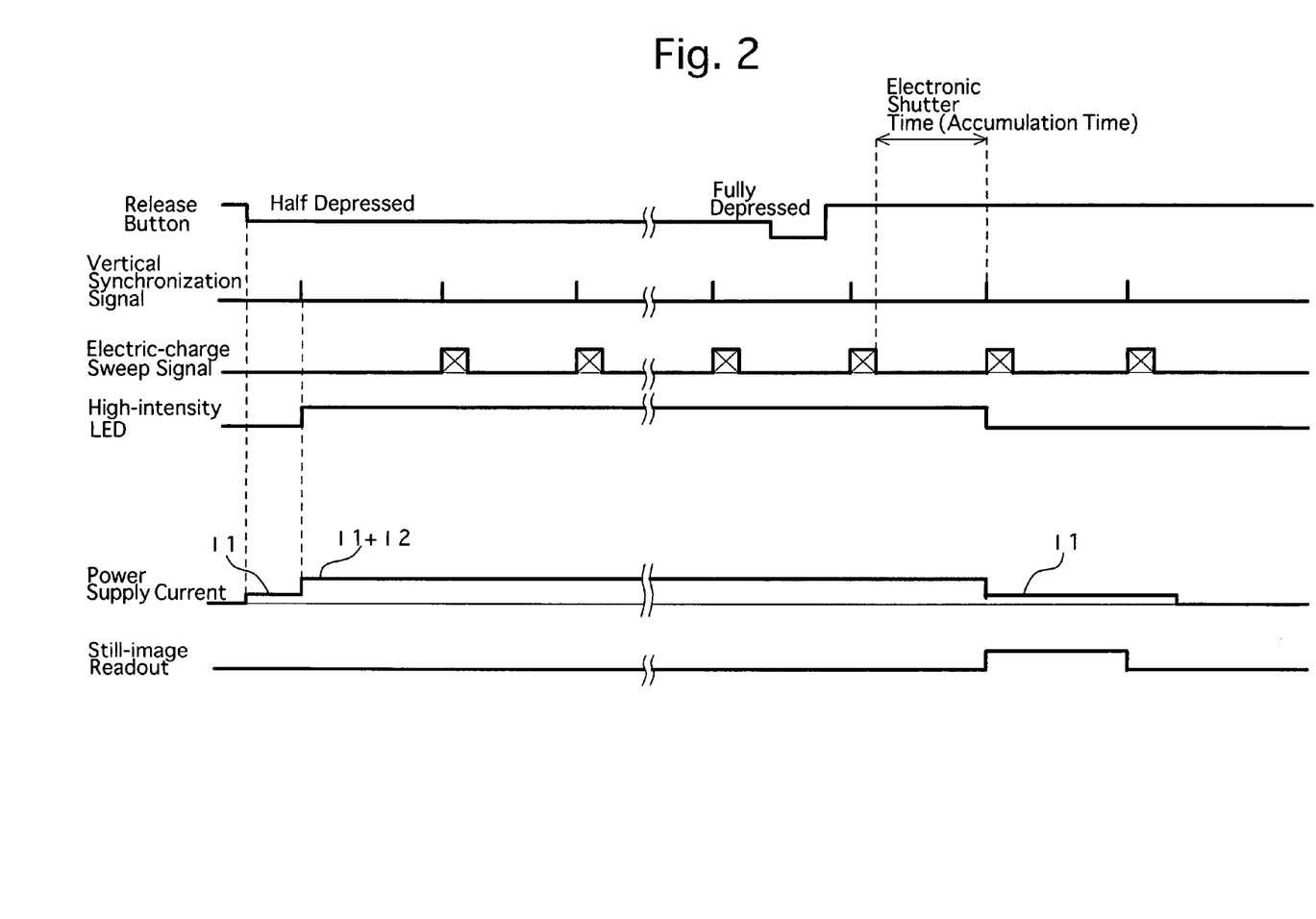
FIG. 2 is a timing chart illustrating the timing of various events when the digital camera performs a typical imaging process of the prior art (in which a high-intensity LED remains lit for a predetermined period of time)
Figure 3:
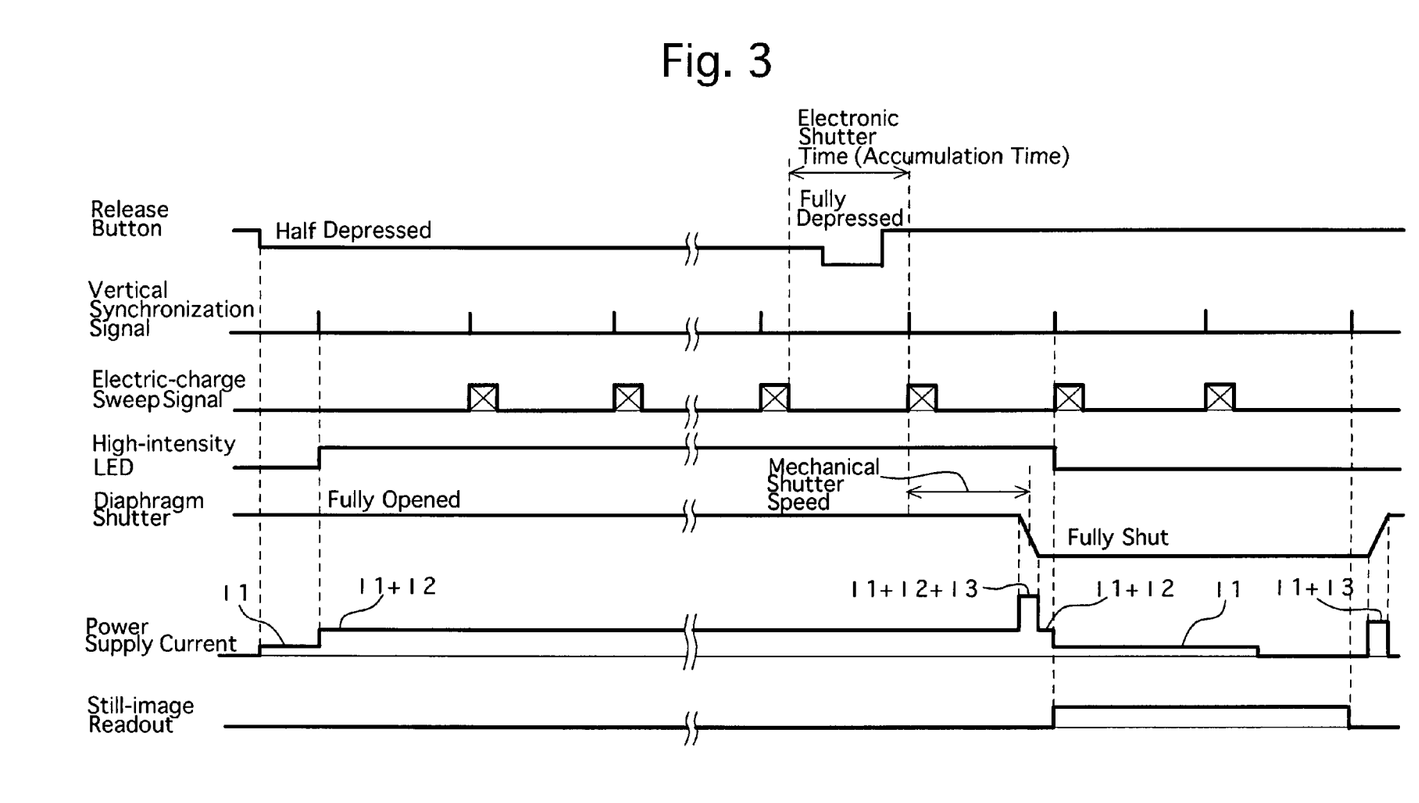
FIG. 3 is a timing chart illustrating the timing of various events when the digital camera performs a typical imaging process of the prior art (in which a high-intensity LED remains lit for a predetermined period of time and a diaphragm shutter is actuated)

Basic prior-art imaging processes of the digital camera will be hereinafter discussed with reference to the timing charts shown in FIGS. 2 and 3. These timing charts illustrate the timing of various events when the digital camera performs a typical conventional imaging process using the high-intensity LED 31. The high-intensity LED 31 is used in the imaging process shown in FIG. 2. In the imaging process shown in FIG. 3, not only the high-intensity LED 31 but also the diaphragm shutter 13 are used. Firstly, the imaging process shown in FIG. 2 will be discussed hereinafter.

Upon the release button 35 being half depressed, a power supply 37 of the portable device feeds a driving current to an imaging circuit (which includes the CCD image sensor 15, the CCD drive circuit 19, the AFE 23, and the signal processing circuit 25) so that the imaging process starts. In the case where the release button 35 is not capable of being half-depressed and subsequently fully-depressed due to the construction thereof, the release button 35 can be operated in conjunction with another operational button, e.g., half-depressing the release button 35 halfway could be equivalent to the case where the digital camera mode is selected in the portable device. In this state, a current I1 is fed to the imaging circuit. This causes the high-intensity LED 31 to light up in synchronization with the vertical synchronization signal which is firstly output after the half-depression of the release button 35. The power supply current necessary for energizing the light-intensity LED 31 is represented by I2 (see FIG. 2).

During a half depression of the release button 35, a driving signal for driving the CCD image sensor 15 continues to be output from the CCD drive circuit 19 to be input to the CCD image sensor 15, so that the CCD image sensor 15 repeats an electric-charge integrating operation and an electric-charge readout operation to output analogue image signals at predetermined intervals from the time when the vertical synchronization signal is firstly output after the half-depression of the release button 35. The analogue image signals output from the CCD image sensor 15 are processed via the AFE 23 and the signal processing circuit 25 to be displayed as visual image on the LCD panel 27. An optimum exposure time (electronic shutter time) is determined from the output analogue image signal by the signal processing circuit 25 and the system control circuit 21. The system control circuit 21 determines an exposure time for the CCD drive circuit 19 via serial communication so that the optimum exposure time is obtained. The exposure time refers to the integral action time or accumulation time of the CCD image sensor 15 in a state where the diaphragm shutter 13 is open.

Immediately after the release button 35 is fully depressed, electric charges are accumulated during the exposure time between the moment at which the CCD drive circuit 19 stops outputting the sweep signal, that the CCD drive circuit 19 outputs in synchronization with the vertical synchronization signal which is firstly output after the full-depression of the release button 35, and the moment at which the subsequent vertical synchronization signal is output from the system control circuit 21. Subsequently, the accumulated electric charges are read out in synchronization with the subsequent vertical synchronization signal to be stored in the internal memory 29 and displayed as a visual image on the LCD monitor 27.

In the above described imaging process in which the diaphragm shutter 13 is not actuated, the peak current (peak value of the power supply current) Imax is the sum of the current I1 and the current I2 (i.e., "I1+I2" shown in FIG. 2), since both the power supply current I1 for driving the imaging circuit and the power supply current I2 for energizing the high-intensity LED 31 are necessary.

Another typical conventional imaging process in which the high-intensity LED 31 and the diaphragm shutter 13 are actuated will be hereinafter discussed with reference to FIG. 3.

Upon the release button 35 being half depressed, the power supply 37 feeds a driving current to an imaging circuit (which includes the CCD image sensor 15, the CCD drive circuit 19, the AFE 23, and the signal processing circuit 25) so that the imaging process starts. In the case where the release button 35 is not capable of being half-depressed and subsequently fully-depressed due to the construction thereof, the release button 35 can be operated in conjunction with another operational button, e.g., half-depressing the release button 35 halfway could be equivalent to the case where the digital camera mode is selected in the portable device. In this state, the current I1 is fed to the imaging circuit so that the imaging circuit operates. Thereafter, the high-intensity LED 31 lights up in synchronization with the vertical synchronization signal which is firstly output after the half-depression of the release button 35. The power supply current necessary for energizing the light-intensity LED 31 is represented by I2 (see FIG. 3).

During a half depression of the release button 35, a driving signal for driving the CCD image sensor 15 continues to be output from the CCD drive circuit 19 to be input to the CCD image sensor 15, so that the CCD image sensor 15 repeats an electric-charge integrating operation and an electric-charge readout operation to output analogue image signals at predetermined intervals from the time when the vertical synchronization signal is firstly output after the half-depression of the release button 35. The analogue image signals output from the CCD image sensor 15 are processed via the AFE 23 and the signal processing circuit 25 to be displayed as a visual image on the LCD panel 27.

Immediately after the release button 35 is fully depressed, a mechanical-shutter speed starts being clocked from the moment at which the vertical synchronization signal is firstly output after the full-depression of the release button 35, and the diaphragm shutter 13 is driven to shut so that the mechanical-shutter speed elapses at the moment at which the diaphragm shutter 13 is half shut. Subsequently, the accumulated electric charges are read out in synchronization with the vertical synchronization signal which is firstly output after the diaphragm shutter 13 is fully shut, and are output as an analogue image signal.

In the above described imaging process in which the high-intensity LED 31 is lit while the diaphragm shutter 13 is actuated, the current I1 and the current I2 are fed to the imaging circuit and the high-intensity LED 31 upon a half depression of the release button 35, and a current I3 is fed to the diaphragm shutter 13 when the diaphragm shutter 13 is driven. Accordingly, the peak current becomes the sum of the current I1, the current I2 and the current I3 (i.e., "I1+I2+I3") in the case shown in FIG. 3, thus becoming very large.

A feature of the present embodiment of the digital camera for portable equipment according to the present invention is that the high-intensity LED 31 and the diaphragm shutter 13 can be actuated while preventing the peak current Imax from becoming large.

First Embodiment

Figure 4:
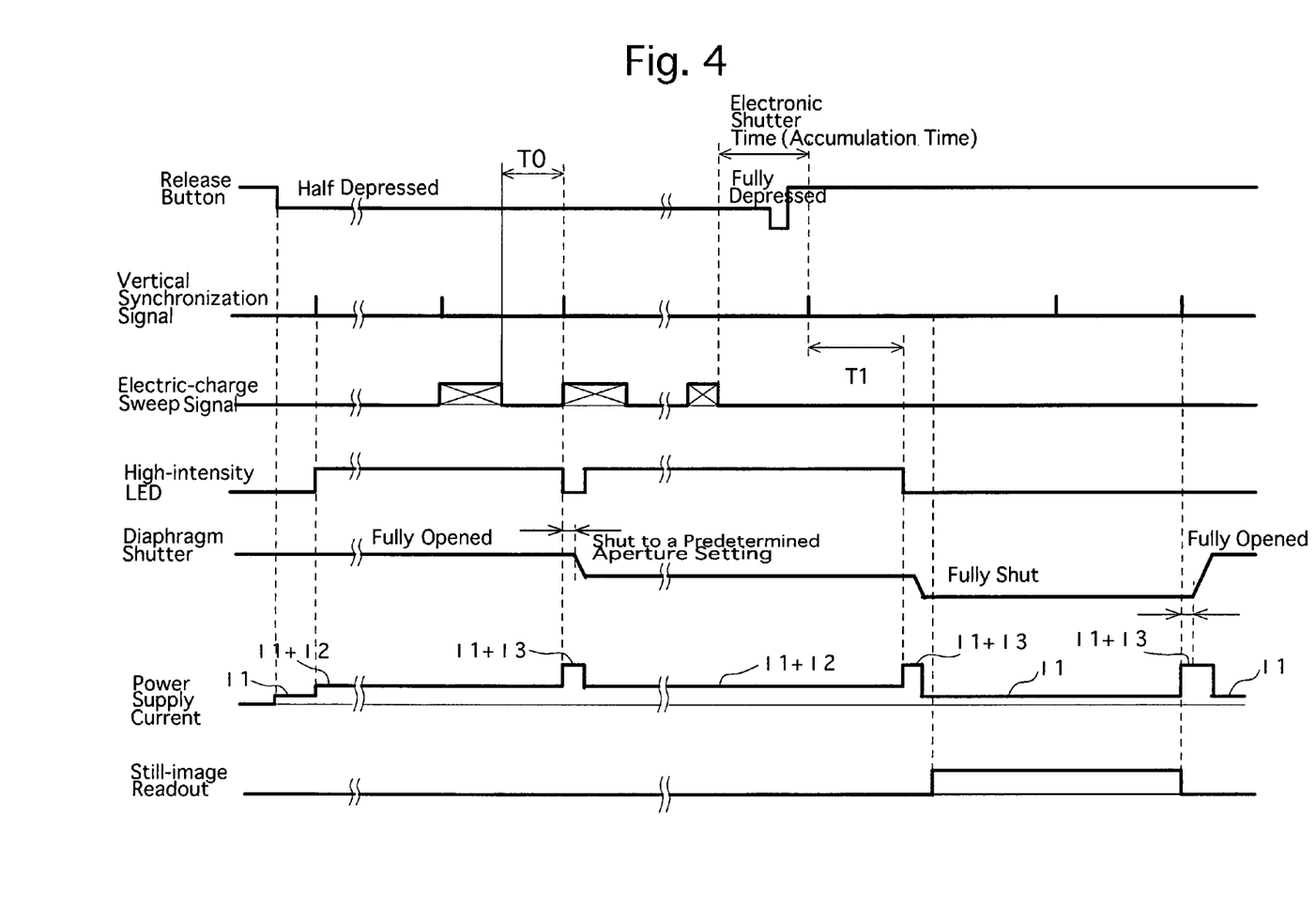
FIG. 4 is a timing chart illustrating the timing of various events when the digital camera performs an imaging process according to a first embodiment of the present invention.
Figure 5:
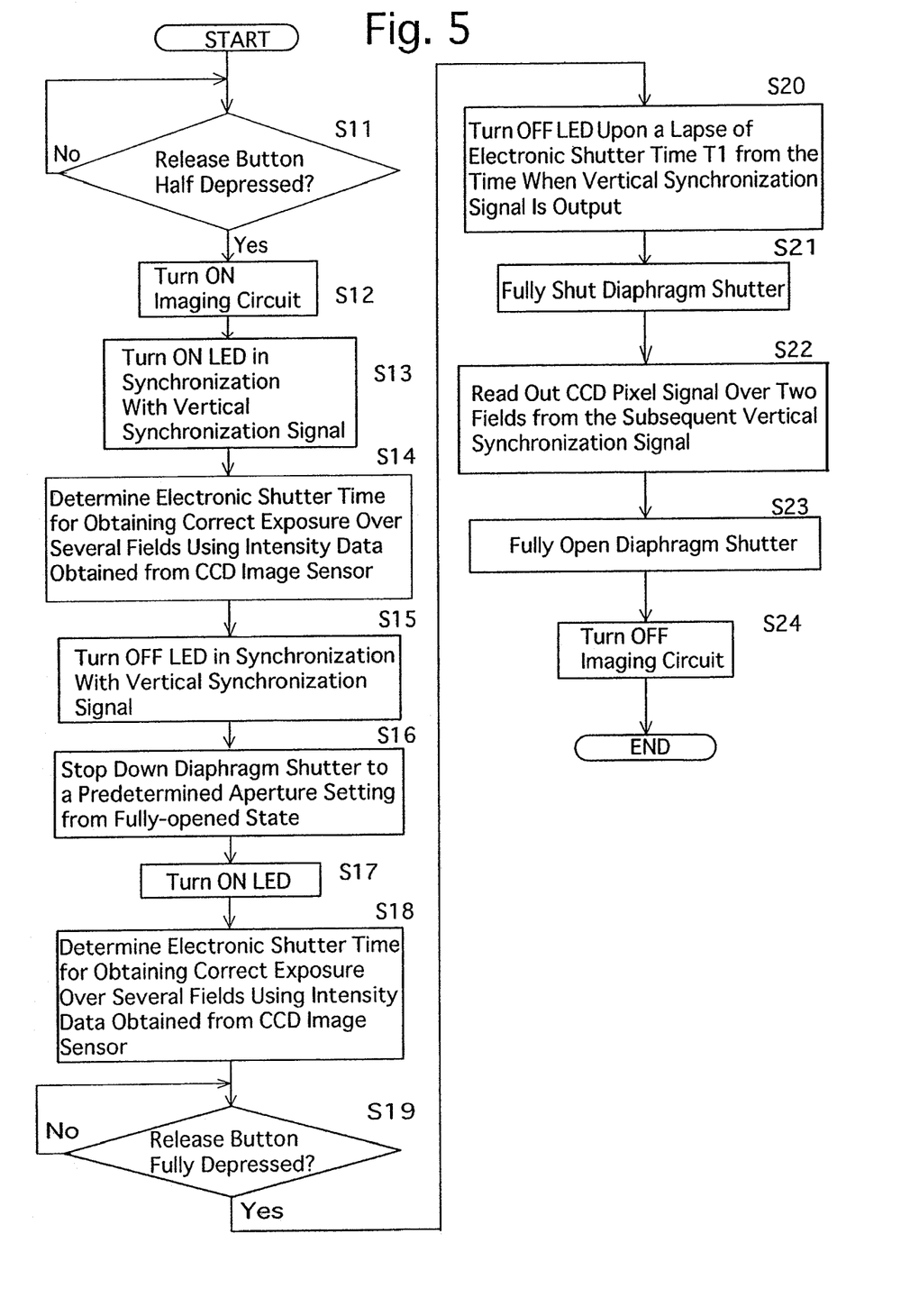
FIG. 5 is a flow chart showing operations in the first embodiment of the imaging process.

A first embodiment of the imaging process performed by the present embodiment of the digital camera for portable equipment according to the present invention will be hereinafter discussed with reference to the timing chart shown in FIG. 4 and the flow chart shown in FIG. 5.

Control waits for the release button 35 to be half depressed (step S11). Upon the release button 35 being half depressed (if YES at step S11), the imaging circuit (which includes the CCD image sensor 15, the CCD drive circuit 19, the AFE 23, and the signal processing circuit 25) is turned ON (step S12), and the high-intensity LED 31 is lit in synchronization with the vertical synchronization signal which is firstly output after the half-depression of the release button 35 (step S13). Due to the operations at steps S12 and S13, the CCD image sensor 15 is driven by the CCD drive circuit 19 while the AFE 23, the signal processing circuit 25 and the LCD monitor 27 are actuated so that the object image captured by the CCD image sensor 15 is displayed on the LCD monitor 27.

Subsequently, using intensity data which is calculated by the signal processing circuit 25 on every field from the pixel signal obtained from the CCD image sensor 15, the system control circuit 21 determines an optimum electronic shutter time T0 for obtaining correct exposure while making corrections to the electronic shutter time over several fields, and sets the CCD drive circuit 19 for the determined optimum electronic shutter time T0 (step S14).

The high-intensity LED 31 is turned OFF in synchronization with the vertical synchronization signal (step S15), the diaphragm shutter 13 is stopped down to a predetermined aperture setting from a full-aperture state via the diaphragm-shutter drive circuit 17 (step S16), and the high-intensity LED 31 is turned ON again upon completion of the stop-down operation of the diaphragm shutter 13 (step S17). This is the case where the object brightness is great; the depth of field can be increased by stopping down the diaphragm shutter 13.

In a state where the high-intensity LED 31 is lit while the diaphragm shutter 13 is stopped down to a predetermined aperture setting, the system control circuit 21 determines and sets an exposure time T1 for obtaining correct exposure in a manner similar to that at step S14 (step S18), and control waits for the release button 35 to be fully depressed (step S19). Even during the time control waits for the release button 35 to be fully depressed, a process for indicating an image signal obtained with the set exposure time T1 as a visual image on the LCD monitor 27 is repeated. During this time, the exposure time can be sequentially varied by detecting intensity data at regular time intervals.

Upon the release button 35 being fully depressed (if YES at step S19), an exposure process, in which control waits for the exposure time T1 to elapse from the moment at which the vertical synchronization signal is firstly output after the full-depression of the release button 35, is performed in synchronization with the vertical synchronization signal. Immediately after the exposure time T1 elapses, the high-intensity LED 31 is turned OFF (step S20), and subsequently, the diaphragm shutter 13 is fully shut (step S21).

In synchronization with the vertical synchronization signal which is firstly output after the diaphragm shutter 13 is fully shut, the CCD image sensor 15 stops integrating electric charges and subsequently pixel signals are read out as still image data from the CCD image sensor 15 over two fields (step S22). The read pixel signals are processed via the AFE 23 and the signal processing circuit 25 to be written in the internal memory 29 as digital image data having a predetermined format.

Upon completion of the readout of the pixel signals, the diaphragm shutter 13 is fully opened (step S23), and the power source for the imaging circuit is turned OFF (step S24) to complete the imaging process (END).

Variations (rise and fall) of the power supply current in time sequence in the first embodiment of the imaging process performed by the present embodiment of the digital camera for portable equipment according to the present invention will be discussed hereinafter.

The power supply current I1 continues to be fed to the imaging circuit from the moment at which the release button 35 is turned ON (half depressed) to the moment at which the vertical synchronization signal is firstly output after the release button 35 is turned ON.

The power supply current I1+I2 commences to be fed to the imaging circuit upon the high-intensity LED 31 being turned ON.

When the diaphragm shutter 13 is driven to stop down the photographing lens 11, the power supply current I1+I3 is fed to the imaging circuit because the diaphragm shutter 13 is driven after the high-intensity LED 31 is turned OFF.

Subsequently, the power supply current I1+I2 is fed to the imaging circuit because the high-intensity LED 31 is turned ON again after the diaphragm shutter 13 is stopped down to a predetermined aperture setting.

Subsequently, the power supply current I1+I3 is fed to the imaging circuit during a closing operation of the diaphragm shutter 13 because the diaphragm shutter 13 is fully shut shortly after the high-intensity LED 31 is turned OFF upon completion of an exposure.

Upon the diaphragm shutter 13 being fully shut, the power supply current I1 is fed to the imaging circuit during a readout of pixel signals. Upon completion of this readout, the power supply current I1+I3 commences to be fed to the imaging circuit, and continues to be fed during the time the diaphragm shutter 13 is driven to fully open. Thereafter, only the power supply current I1 is fed to the imaging circuit immediately after the diaphragm shutter 13 is fully opened.

In the first embodiment of the imaging process, the diaphragm shutter 13 and the high-intensity LED 31 are not driven simultaneously, and therefore the peak current is limited to the current I1+I3, or the current I1+I2 in the case where the power supply current I2 for lighting the high-intensity LED 31 becomes greater than the power supply current I3 for driving the diaphragm shutter 13.

Second Embodiment

In the above described first embodiment of the imaging process, although the high-intensity LED 31 is turned OFF immediately after a lapse of the exposure time (exposure time) T1, the CCD image sensor 15 continues to be exposed until the diaphragm shutter 13 is fully shut, which results in slight overexposure. A second embodiment of the imaging process performed by the present embodiment of the digital camera for portable equipment according to the present invention, wherein an imaging operation at correct exposure is achieved with less power consumption, will be hereinafter discussed with reference to the timing chart shown in FIG. 6 and the flow chart shown in FIG. 7.

Figure 6:
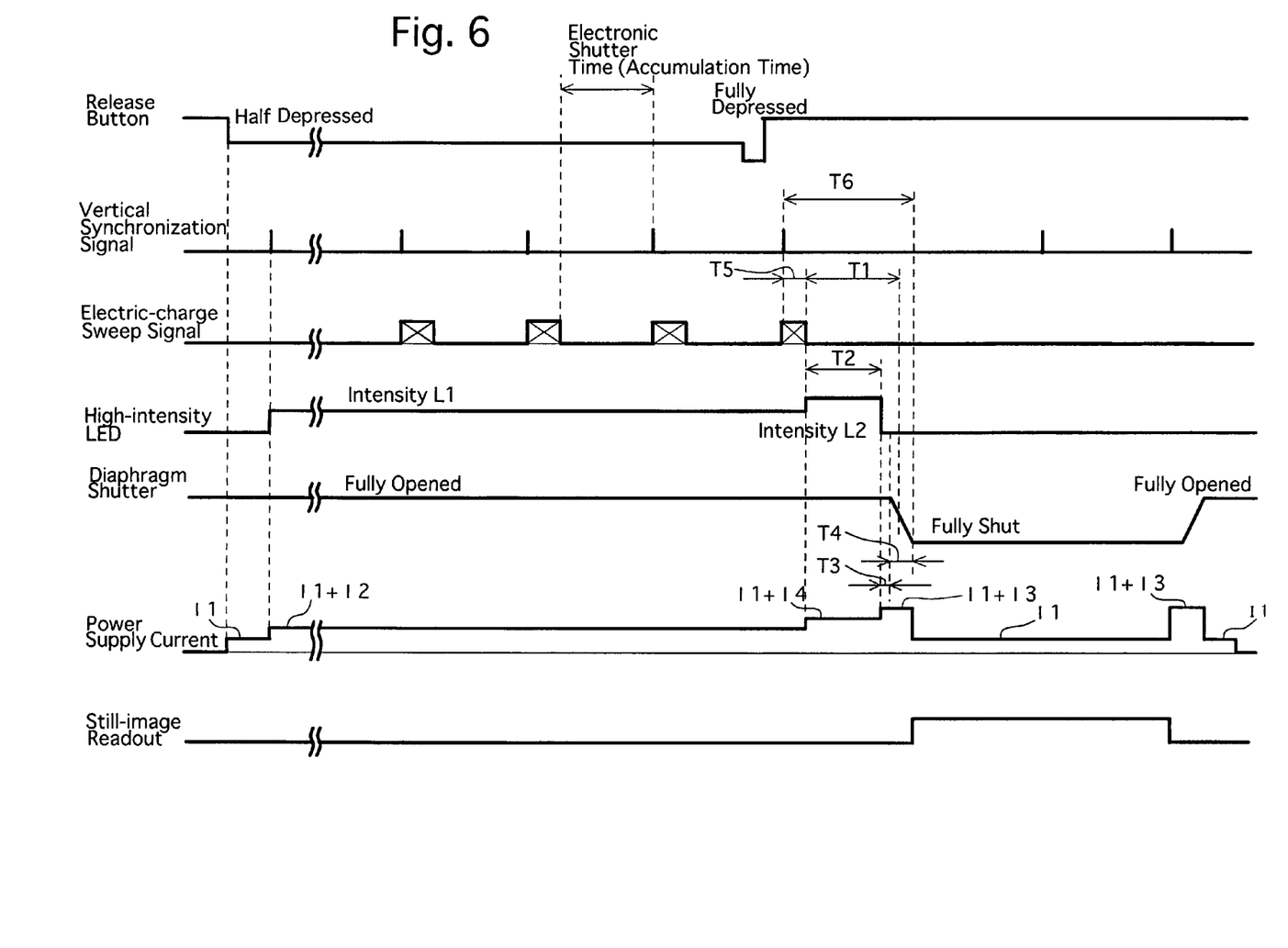
FIG. 6 is a timing chart illustrating the timing of various events when the digital camera performs an imaging process according to a second embodiment of the present invention.
Figure 7:
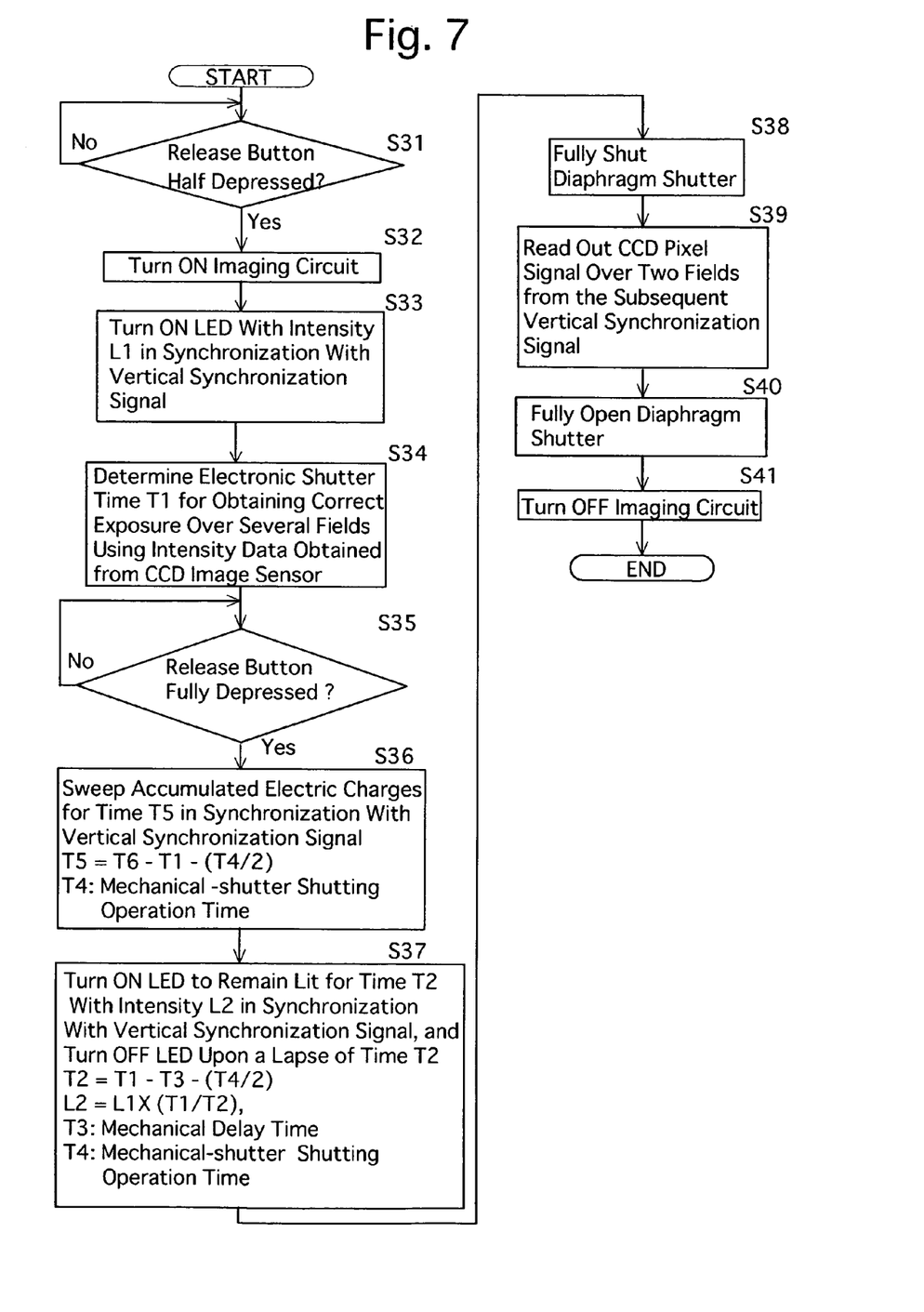
FIG. 7 is a flow chart showing operations in the second embodiment of the imaging process.

Control waits for the release button 35 to be half depressed (step S31). Upon the release button 35 being half depressed (if YES at step S31), the imaging circuit (which includes the CCD image sensor 15, the CCD drive circuit 19, the AFE 23, and the signal processing circuit 25) is turned ON (step S32), and the high-intensity LED 31 is lit with a low intensity L1 in synchronization with the vertical synchronization signal which is firstly output after the half-depression of the release button 35 (step S33). Namely, the CCD image sensor 15 is driven by the CCD drive circuit 19 with the high-intensity LED 31 remaining on with the low intensity L1, while the AFE 23, the signal processing circuit 25 and the LCD monitor 27 are actuated so that the object image captured by the CCD image sensor is displayed on the LCD monitor 27.

Subsequently, using intensity data which is calculated by the signal processing circuit 25 on every field from the pixel signal obtained from the CCD image sensor 15, the system control circuit 21 determines an exposure time T1 and an aperture value for obtaining correct exposure while making corrections to the exposure time and the aperture value over several fields, and sets the CCD drive circuit 19 for the determined exposure time T1 and the determined aperture value (step S34). Control waits for the release button 35 to be fully depressed while repeating the imaging process performed with the calculated exposure time T1 (step S35).

Upon the release button 35 being fully depressed (if YES at step S35), the sweep signal is output from the CCD drive circuit 19 for a period of time T5 in synchronization with the vertical synchronization signal which is firstly output after the full-depression of the release button 35 (step S36). The period of time T5 is determined from the following equation:

$$T5=T6-T1-(T4/2)$$

T4 represents a mechanical-shutter shutting operation time (the time necessary for the diaphragm shutter 13 to be fully shut from the fully-open position thereof). T6 represents field time (the time interval between two vertical synchronization signals).

Immediately after the period of time T5 elapses, the high-intensity LED 31 is turned ON at the high intensity L2 to stay lit for a period of time T2, and is subsequently turned OFF immediately after a lapse of the period of time T2 (step S37). The period of time T2 is determined from the following equation:

$$T2=T1-T3-(T4/2)$$

$$L2=L1\times(T1/T2)$$

T3 represents the mechanical delay time (lag time between a startup of the diaphragm shutter 13 and the actual commencement of shutting operation of the diaphragm shutter 13.

The power supply current for making the high-intensity LED 31 remain lit with the low intensity L1 is represented by I2, and the power supply current for making the high-intensity LED 31 remain lit with a high intensity L2 is represented by I4. The power supply current I2 is smaller than the power supply current I4. Therefore, the light emitted from the high-intensity LED 31 with the high intensity L2 is brighter than the light emitted from the high-intensity LED 31 with the low intensity L1.

Immediately after a lapse of the period of time T2, the system control circuit 21 sends a shutting signal to the diaphragm-shutter drive circuit 17, and consequently, the diaphragm shutter 13 is fully shut (step S38). Although the diaphragm shutter 13 commences to be energized to fully shut via the diaphragm-shutter drive circuit 17 immediately after the period of time T2 elapses, the diaphragm shutter 13 actually commences to shut immediately after a lapse of the mechanical delay time T3, and is fully shut immediately after a lapse of the mechanical-shutter shutting operation time T4.

Immediately after a lapse of the mechanical-shutter shutting operation time T4, pixel signals are read out as still image data from the CCD image sensor 15 over two fields to be written in the internal memory 29 as digital image data (step S39). Thereafter, the diaphragm shutter 13 is driven to fully open (step S40), and the power source for the imaging circuit is turned OFF (step S41) to complete the imaging process (END).

Variations (rise and fall) of the power supply current in time sequence in the second embodiment of the imaging process performed by the present embodiment of the digital camera for portable equipment according to the present invention will be discussed hereinafter.

The power supply current I1 continues to be fed to the imaging circuit from the moment at which the release button 35 is turned ON (half depressed) to the moment at which the vertical synchronization signal is firstly output after the release button 35 is turned ON.

Upon the high-intensity LED 31 being turned ON, the power supply current I1+I2 commences to be fed to the imaging circuit because the high-intensity LED 31 is turned ON to remain lit with the low intensity L1 in synchronization with the vertical synchronization signal which is firstly output immediately after the high-intensity LED 31 is turned ON.

Upon the release button 35 being fully depressed, the power supply current I1+I4 commences to be fed to the imaging circuit because the high-intensity LED 31 is turned ON to remain lit with the high intensity L2 in synchronization with the vertical synchronization signal which is firstly output after the full-depression of the release button 35.

Subsequently, the power supply current I1+I3 is fed to the imaging circuit because the diaphragm shutter 13 is actuated to be fully shut while the high-intensity LED 31 is turned OFF immediately after a lapse of the period of time T5+T2 from the moment at which the aforementioned first vertical synchronization signal is output.

Subsequently, the power supply current I1 is fed to the imaging circuit because the current fed to the diaphragm shutter 13 is cut off immediately after the high-intensity LED 31 is turned OFF.

Upon the diaphragm shutter 13 being fully shut, the power supply current I1 is fed to the imaging circuit during a readout of pixel signals. Upon completion of this readout, the power supply current I1+I3 commences to be fed to the imaging circuit, and continues to be fed during the time the diaphragm shutter 13 is driven to fully open. Thereafter, only the power supply current I1 is fed to the imaging circuit immediately after the diaphragm shutter 13 is fully opened.

In the second embodiment of the imaging process, the diaphragm shutter 13 and the high-intensity LED 31 are not driven simultaneously, and therefore the peak current is limited to the current I1+I3, or the current I1+I4 in the case where the power supply current I4 for lighting the high-intensity LED 31 becomes greater than the power supply current I3 for driving the diaphragm shutter 13.

Moreover, an object image can be captured at correct exposure because the high-intensity LED 31 is turned ON to remain lit with the high-intensity L2 (which is greater in brightness than the low-intensity L1) during an exposure so that a correct exposure is attained with the exposure time T1 that is set on condition that the high-intensity LED 31 remains lit with the low intensity L1 over the entire exposure time.

In the second embodiment of the imaging process shown in FIG. 7, the high-intensity LED 31 can be replaced by a plurality of LEDs so that all the LEDs are turned ON when emitting light with the high intensity L2 and that a portion (e.g., a half) of all the LEDs are turned ON (or OFF) when emitting light with the low intensity L1.

Third Embodiment

Figure 8:
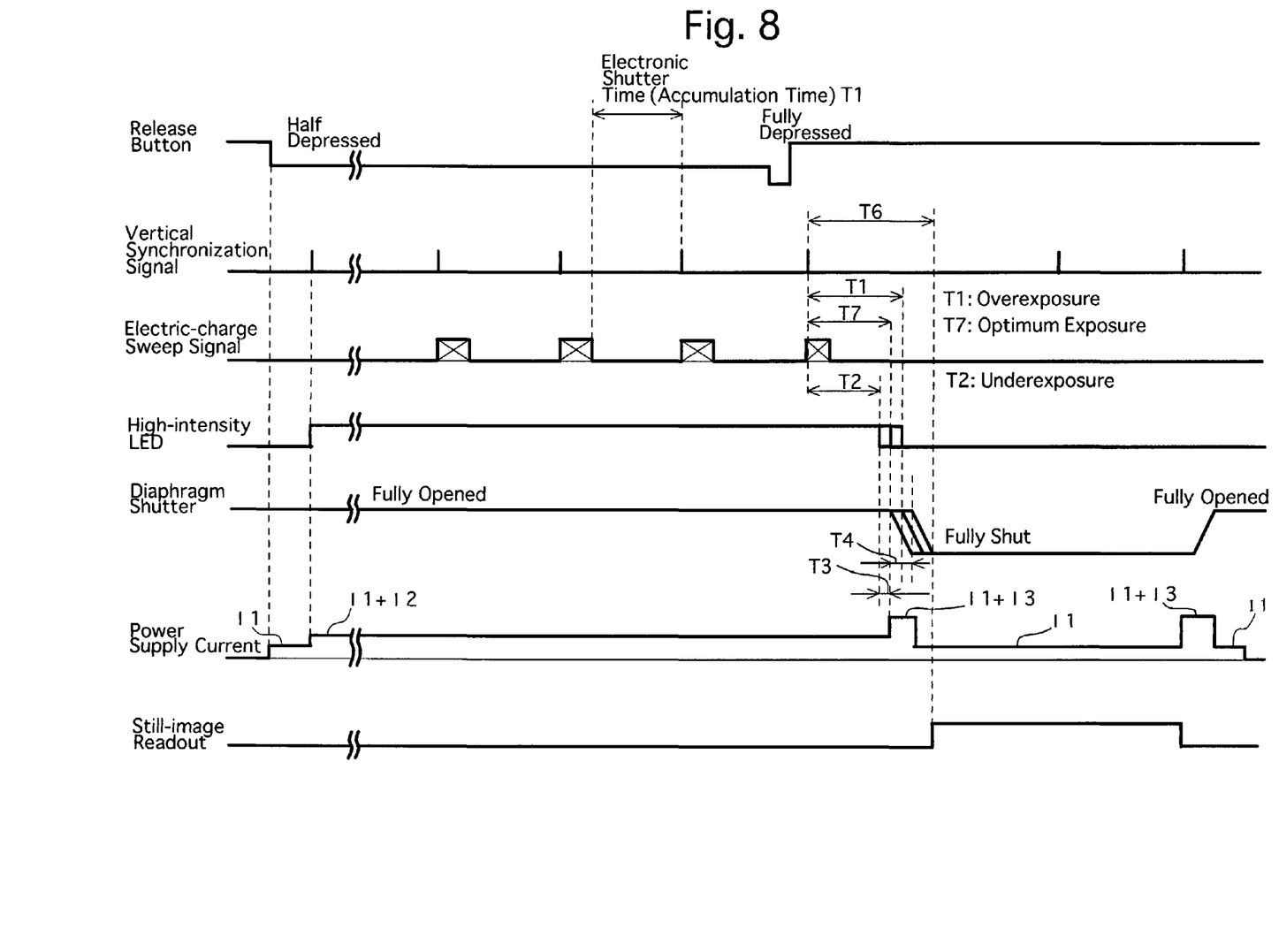
FIG. 8 is a timing chart illustrating the timing of various events when the digital camera performs an imaging process according to a third embodiment of the present invention.
Figure 9:
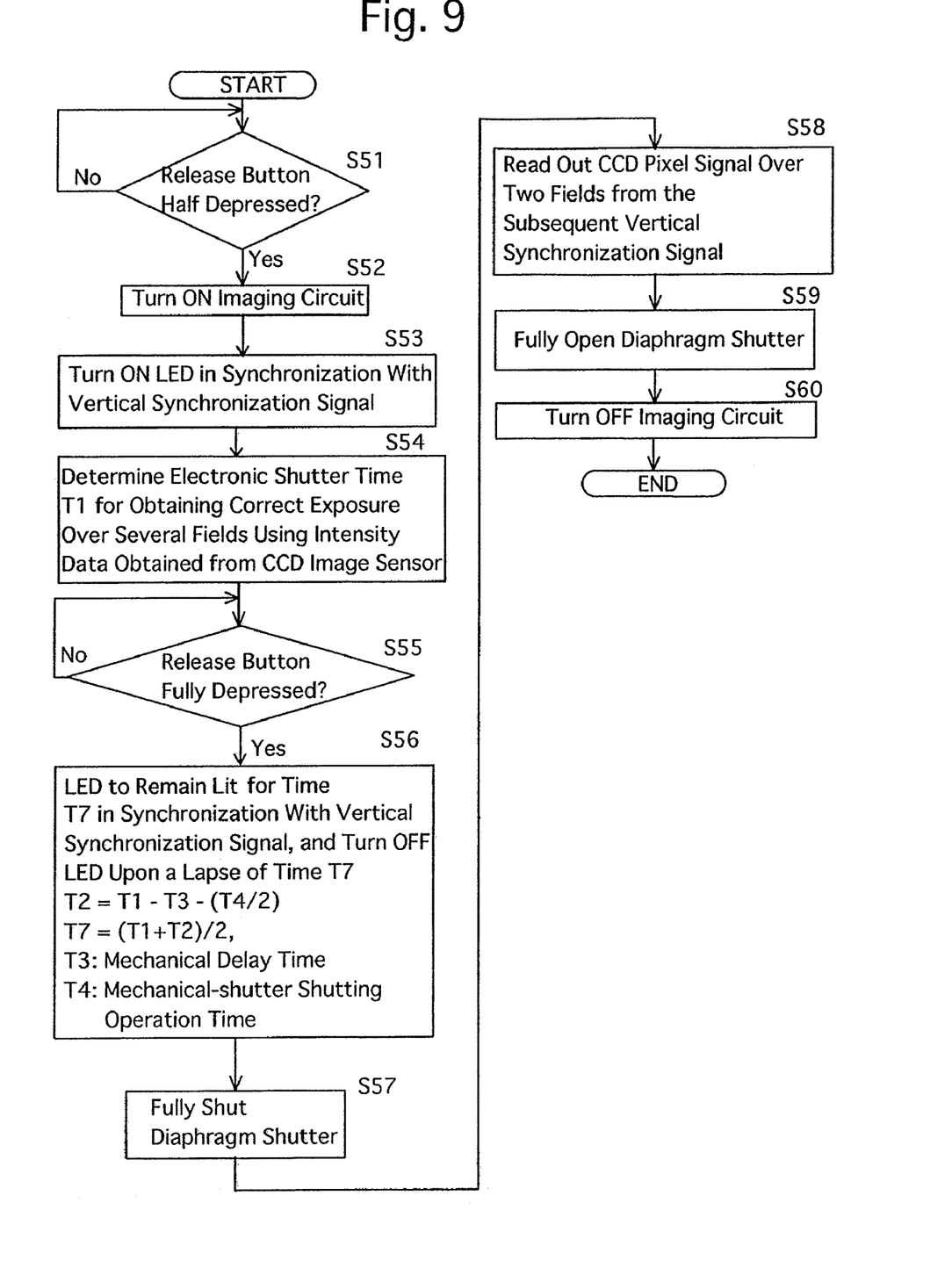
FIG. 9 is a flow chart showing operations in the third embodiment of the imaging process.

A third embodiment of the imaging process performed by the present embodiment of the digital camera for portable equipment according to the present invention, wherein an imaging operation at correct exposure is achieved while minimizing the peak current, will be hereinafter discussed with reference to the timing chart shown in FIG. 8 and the flow chart shown in FIG. 9.

Control waits for the release button 35 to be half depressed (step S51). Upon the release button 35 being half depressed (if YES at step S51), the imaging circuit (which includes the CCD image sensor 15, the CCD drive circuit 19, the AFE 23, and the signal processing circuit 25) is turned ON (step S52), and the high-intensity LED 31 is turned ON in synchronization with the vertical synchronization signal which is firstly output after the half-depression of the release button 35 (step S53). Due to the operations at steps S52 and S53, the CCD image sensor 15 is driven by the CCD drive circuit 19, while the AFE 23, the signal processing circuit 25 and the LCD monitor 27 are actuated so that the object image captured by the CCD image sensor 15 is displayed on the LCD monitor 27.

Subsequently, in a manner similar to that at step S34 shown in FIG. 7, the system control circuit 21 determines an exposure time T1 and an aperture value for obtaining correct exposure, and sets the CCD drive circuit 19 for the determined exposure time T1 and the determined aperture value (step S54). Control waits for the release button 35 to be fully depressed while repeating the imaging process performed with the calculated exposure time T1 in a manner similar to that at step S35 shown in FIG. 7 (step S55).

Upon the release button 35 being fully depressed (if YES at step S55), control waits for an exposure time T7 to elapse from the moment at which the vertical synchronization signal is firstly output after the full-depression of the release button 35. Immediately after the exposure time T7 elapses, the high-intensity LED 31 is turned OFF. The exposure time T7 is determined from the following equation:

$$T2=T1-T3-(T4/2)$$

$$T7=(T1+T2)/2$$

T3 represents the mechanical delay time, and T4 represents the mechanical-shutter shutting operation time.

Note that the exposure time T1, which represents a calculated optimum exposure time, is determined to obtain correct exposure if the diaphragm shutter 13 is half shut upon a lapse of the period of time T1 in a state where the high-intensity LED 31 remains lit during exposure. Therefore, if the high-intensity LED 31 is turned OFF while the diaphragm shutter 13 starts to be energized to fully shut immediately after the exposure time T7 elapses, the diaphragm shutter 13 commences to shut immediately after a lapse of the mechanical delay time T3; and subsequently, the exposure time T1 elapses at the moment the diaphragm shutter 13 commences to shut, thus resulting in a substantially correct exposure. However, if the high-intensity LED 31 is turned OFF while the diaphragm shutter 13 starts to be energized to fully closed immediately after the exposure time T1 elapses, the exposure time is extended by the sum of the mechanical delay time T3 and the mechanical-shutter shutting operation time T4, which results in overexposure. On the other hand, if the high-intensity LED 31 is turned OFF while the diaphragm shutter 13 starts to be energized to be fully closed at a predetermined period of time T3+T4 (the sum of the mechanical delay time T3 and the mechanical-shutter shutting operation time T4) before the exposure time T1 elapses, the exposure time T1 elapses upon the diaphragm shutter 13 being half shut, which results in underexposure.

Immediately after the exposure time T7 elapses, the diaphragm shutter 13 is fully shut (step S57). Upon the diaphragm shutter 13 being fully shut, pixel signals are read out as still image data from the CCD image sensor 15 over two fields, and are processed via the AFE 23 and the signal processing circuit 25 to be written in the internal memory 29 as digital image data and, at the same time, are displayed as visual image on the LCD monitor 27 for a predetermined period of time (step S58).

Thereafter, the diaphragm shutter 13 is driven to fully open (step S59), and the power source for the imaging circuit is turned OFF (step S60) to complete the imaging process (END).

Variations (rise and fall) of the power supply current in time sequence in the third embodiment of the imaging process performed by the present embodiment of the digital camera for portable equipment according to the present invention will be discussed hereinafter.

The power supply current I1 continues to be fed to the imaging circuit from the moment at which the release button 35 is turned ON (half depressed) to the moment at which the vertical synchronization signal is firstly output after the release button 35 is turned ON.

Upon the high-intensity LED 31 being turned ON, the power supply current I1+I2 commences to be fed to the imaging circuit.

When the diaphragm shutter 13 is fully shut upon completion of an exposure, the power supply current I1+I3 is fed to the imaging circuit because the diaphragm shutter 13 is driven after the high-intensity LED 31 is turned OFF.

Thereafter, the power supply current I1 is fed to the imaging circuit during a readout of a still image data. Upon completion of the readout of the still image data, the power supply current I1+I3 commences to be fed to the imaging circuit, and continues to be fed during the time the diaphragm shutter 13 is driven to fully open. Thereafter, only the power supply current I1 resumes to be fed to the imaging circuit immediately after the diaphragm shutter 13 is fully opened.

In the third embodiment of the imaging process, the diaphragm shutter 13 and the high-intensity LED 31 are not driven simultaneously, and therefore, the peak current is limited to the current I1+I3, or the current I1+I2 in the case where the power supply current I2 for lighting the high-intensity LED 31 becomes greater than the power supply current I3 for driving the diaphragm shutter 13.

Moreover, in the third embodiment of the imaging process, an object image can be captured at correct exposure because the exposure time T7, upon a lapse of which the high-intensity LED 31 is turned OFF while the diaphragm shutter 13 is actuated to be fully shut, is set between the exposure time T1 which causes overexposure and the exposure time T2 which causes underexposure.

Although the above described embodiment of the digital camera for portable equipment is provided with the CCD image sensor 15 as an image pick-up device, the CCD image sensor 15 can be replaced by a CMOS image sensor.

Although the above described embodiment of the digital camera for portable equipment is provided with the diaphragm shutter 13 as a light quantity controller, the diaphragm shutter 13 can be replaced by a diaphragm and a shutter which are provided independently of each other. Additionally, the above described embodiment of the digital camera for portable equipment can be provided with a light quantity controller which moves or rotates an ND filter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera, comprising:
an imaging device that receives power from a power source to form an image on an image forming surface;
a light emitting device that receives power from the power source while emitting light;
an electrically-driven mechanical shutter for controlling a quantity of light incident onto the image forming surface; and
a system controller which drives said imaging device, said mechanical shutter and said light emitting device, controls operations of said imaging device, said mechanical shutter and said light emitting device, and determines an optimum exposure time in accordance with an image signal of an object image captured by said imaging device,
wherein, when an object image is captured with said light emitting device turned ON at a low intensity, said system controller determines said optimum exposure time with said light emitting device remaining ON at said low intensity, controls said light emitting device to remain ON at a high intensity at a commencement of an exposure, and drives said mechanical shutter to fully shut after turning said light emitting device OFF before completion of said exposure, and wherein said system controller determines a underexposure-prevention time, at which said system controller turns said light emitting device OFF and commences to drive said mechanical shutter, so that said mechanical shutter is approximately half shut upon a lapse of said optimum exposure time.

2. The digital camera according to claim 1, wherein said light emitting device comprises at least one high-intensity LED.

3. The digital camera according to claim 1, wherein said electrically-driven mechanical shutter comprises an electrically-driven diaphragm which is driven by said system controller.

4. The digital camera according to claim 1, the light emitting device comprising a plurality of LEDs, wherein turning of the light emitting device ON at high intensity comprises actuating all of the plurality of LEDs and turning the light emitting device ON at low intensity comprises actuating less than all of the plurality of LEDs.

5. The digital camera according to claim 1, wherein a ratio of high intensity to low intensity of the light emitting device is determined based upon a ratio of the determined optimum exposure time to a time that the light emitting device is controlled to remain ON at high intensity.

6. A digital camera, comprising:
an imaging device that receives power from a power source to form an image on an image forming surface;
a light emitting device that receives power from the power source while emitting light;
an electrically-driven mechanical shutter for controlling a quantity of light incident onto the image forming surface; and
a system controller which drives said imaging device, said mechanical shutter and said light emitting device, controls operations of said imaging device, said mechanical shutter and said light emitting device, and determines an optimum exposure time in accordance with an image signal of an object image captured by said imaging device,
wherein, when an object image is captured with said light emitting device turned ON, said system controller determines said optimum exposure time with said light emitting device remaining ON, subsequently determines a underexposure-prevention time, at which said system controller turns said light emitting device OFF while said system controller commences to drive said mechanical shutter after said imaging device commences an exposure operation, so that said mechanical shutter is approximately half shut upon lapse of said optimum exposure time, and subsequently commences to drive said mechanical shutter after turning said light emitting device OFF upon lapse of said underexposure-prevention time from said commencement of said exposure operation.

7. The digital camera according to claim 6, wherein said light emitting device comprises at least one high-intensity LED.

8. The digital camera according to claim 6, wherein the light emitting device is turned OFF at an end of a time period determined by a difference between the optimum exposure time and a time related to a mechanical delay and to a shutting operation of the mechanical shutter.

* * * * *